United States Patent
Bucu et al.

(10) Patent No.: US 8,892,867 B1
(45) Date of Patent: Nov. 18, 2014

(54) TECHNIQUES FOR PROTECTING DATA IN CLOUD COMPUTING ENVIRONMENTS

(71) Applicant: Trend Micro Incorporated, Tokyo (JP)

(72) Inventors: Jayronn Christian Sulit Bucu, Pasig (PH); Frederic Fritz Anciano Vila, Pasay (PH); Nicholas Carlo Talens Ramos, Manila (PH)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 13/934,902

(22) Filed: Jul. 3, 2013

Related U.S. Application Data

(62) Division of application No. 12/562,316, filed on Sep. 18, 2009, now Pat. No. 8,510,835.

(51) Int. Cl.
*H04L 29/06* (2006.01)
*H04L 9/00* (2006.01)

(52) U.S. Cl.
CPC ..................................... *H04L 9/002* (2013.01)
USPC ............. 713/150; 713/177; 713/180; 726/22; 726/23; 726/24; 726/26

(58) Field of Classification Search
CPC ... H04L 9/08; H04L 63/0428; H04L 63/0442; H04L 63/083; G06F 21/36; G06F 21/305
USPC ................. 726/22–24, 26; 713/177–180, 150
See application file for complete search history.

(56) References Cited

U.S. PATENT DOCUMENTS

| | | | |
|---|---|---|---|
| 2003/0065919 A1* | 4/2003 | Albert et al. ................... | 713/168 |
| 2003/0177392 A1* | 9/2003 | Hiltgen ......................... | 713/201 |
| 2004/0205344 A1* | 10/2004 | Otway et al. .................. | 713/169 |
| 2008/0077803 A1* | 3/2008 | Leach et al. .................. | 713/189 |

* cited by examiner

*Primary Examiner* — Mohammad A Siddiqi
(74) *Attorney, Agent, or Firm* — Okamoto & Benedicto LLP

(57) ABSTRACT

A client computer runs a communicator employed to connect to a server computer in a cloud. The communicator is updated on a regular basis to update its algorithms for processing raw data into secured data. The server computer receives and validates the secured data, and attempts to update the communicator if the secured data is invalid. The server computer may deem the client computer as being infected when the update is reinitiated a predetermined number of times. The raw data may be restructured, or encrypted using an encryption scheme where the key used for the encryption is not provided to the receiver of the data. The algorithm for data restructuring and encryption may be included in the update to the communicator. Communication between the client computer and the server computer may be on a dynamically selected channel indicated in a previous communication.

11 Claims, 18 Drawing Sheets

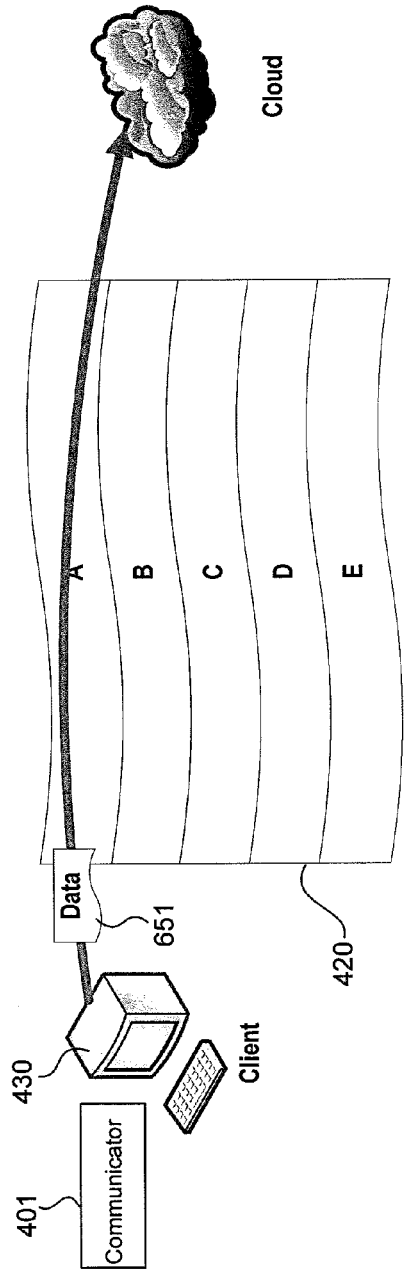
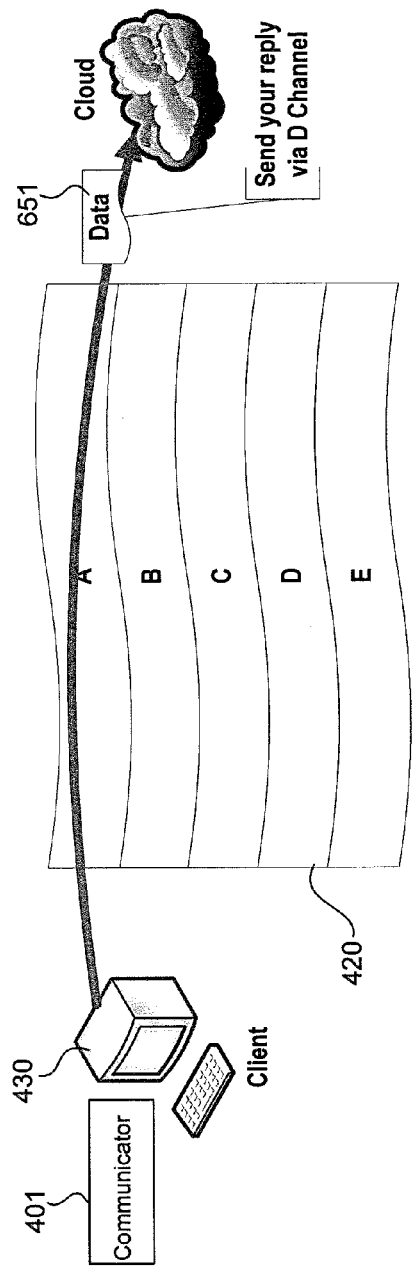

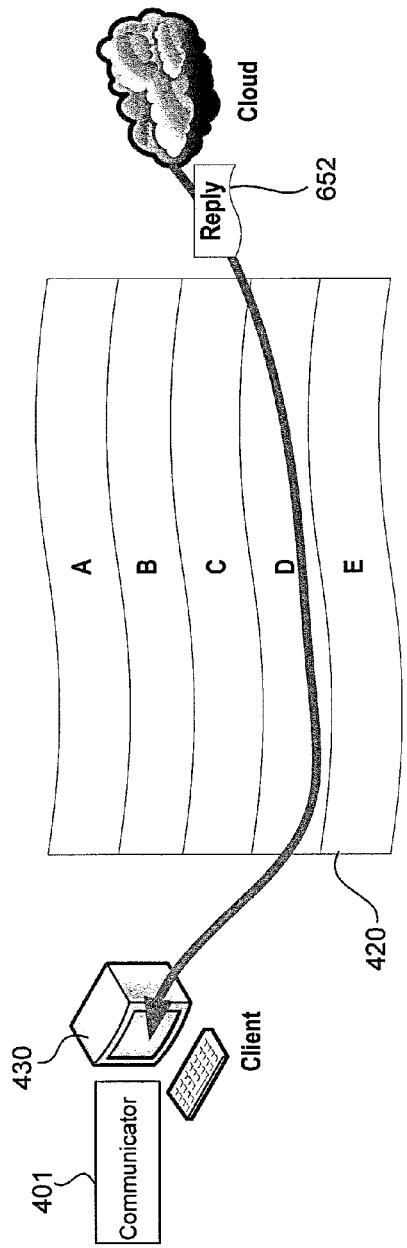
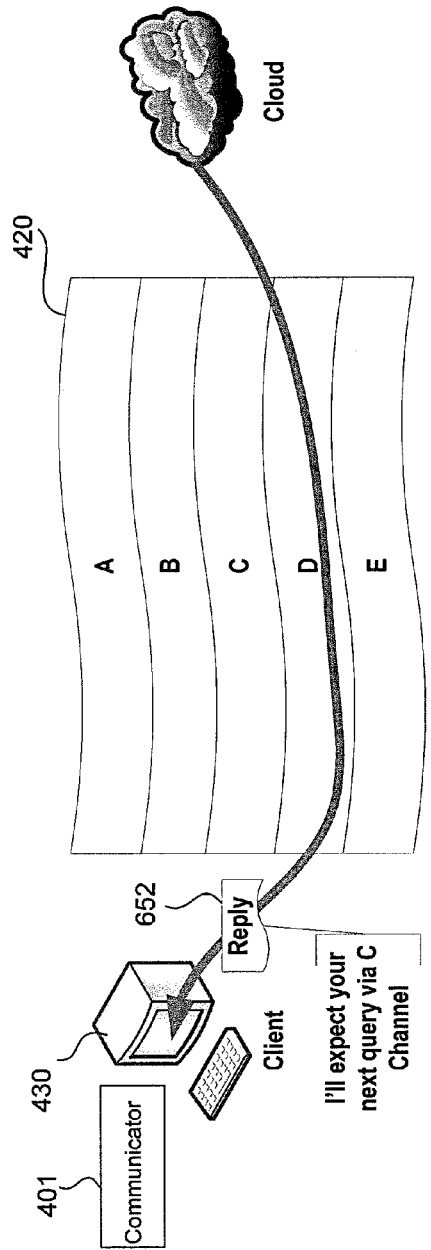

TECHNIQUES FOR PROTECTING DATA IN CLOUD COMPUTING ENVIRONMENTS

CROSS-REFERENCE TO RELATED APPLICATION

This application is a divisional of U.S. application Ser. No. 12/562,316, filed on Sep. 18, 2009, which is incorporated herein by reference in its entirety.

BACKGROUND OF THE INVENTION

1. Field of the Invention

The present invention relates generally to computer security, and more particularly but not exclusively to in-the-cloud computing.

2. Description of the Background Art

Cloud computing allows a user to utilize applications or services running on a remotely located computer rather than on the user's local computer. For example, data may be processed in the cloud by forwarding the data from a client computer to a server computer, where the data is processed before returning the processed data back to the client computer. This way, the client computer offloads processing tasks to computers in the cloud. While cloud computing has many advantages, processing data in the cloud is not without risk. Because the data to be processed need to be transferred over a computer network, the data is especially vulnerable to online computer security threats, such as eavesdropping, phishing, and interception, to name a few examples.

SUMMARY

A client computer runs a communicator employed to connect to a server computer in a cloud. The communicator is updated on a regular basis to update its algorithms for processing raw data into secured data. The server computer receives and validates the secured data, and attempts to update the communicator if the secured data is invalid. The server computer may deem the client computer as being infected when the update is reinitiated a predetermined number of times. The raw data may be restructured, or encrypted using an encryption scheme where the key used for the encryption is not provided to the receiver of the data. The algorithm for data restructuring and encryption may be included in the update to the communicator. Communication between the client computer and the server computer may be on a dynamically selected channel indicated in a previous communication.

These and other features of the present invention will be readily apparent to persons of ordinary skill in the art upon reading the entirety of this disclosure, which includes the accompanying drawings and claims.

DESCRIPTION OF THE DRAWINGS

FIGS. 20-24 schematically illustrate a third layer of data protection involving dynamic communication channel selection in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
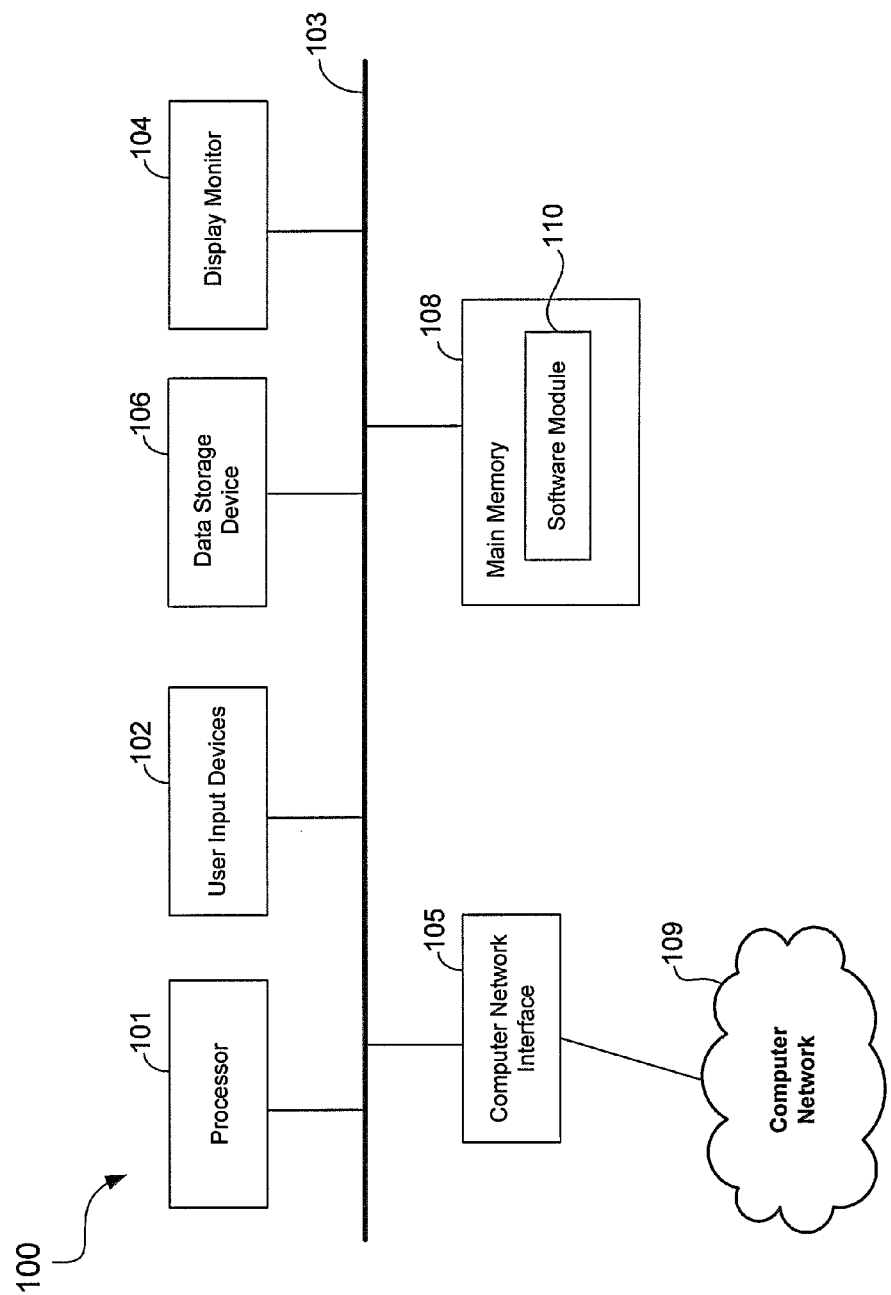
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a server computer in the cloud or as a client computer communicating with the cloud. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes software modules 110, which may comprise software components of a server computer in the cloud or a client computer. The software modules 110 may be loaded from the data storage device 106 to the main memory 108 for execution by the processor 101.

Figure 2:
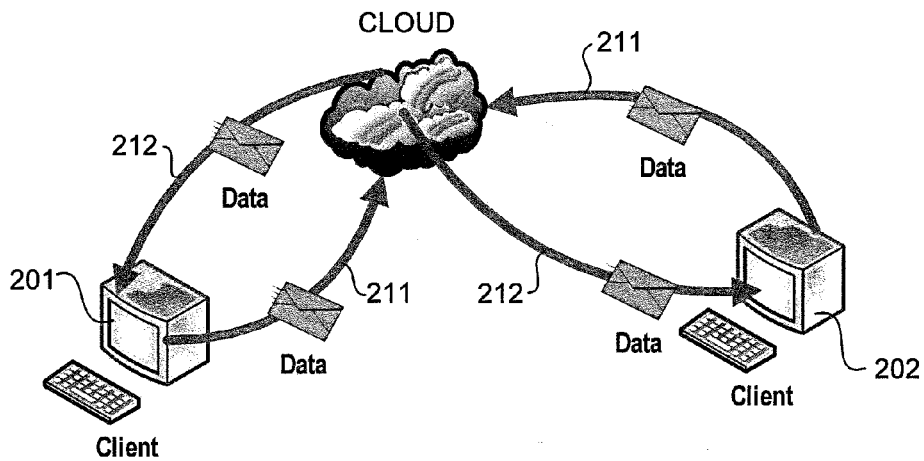
FIG. 2 schematically illustrates typical data processing in a cloud.

FIG. 2 schematically illustrates typical data processing in the cloud. In the example of FIG. 2, client computers 201 and 202 send data for processing in the cloud (arrows 211). The cloud represents one or more server computers configured (e.g., programmed) to process the data. For example, the cloud may include server computers for scanning emails for spam, computer viruses, or other security threats. The cloud processes the data, and forwards the processed data back to the client computers 201 and 202 (arrows 212).

Figure 3:
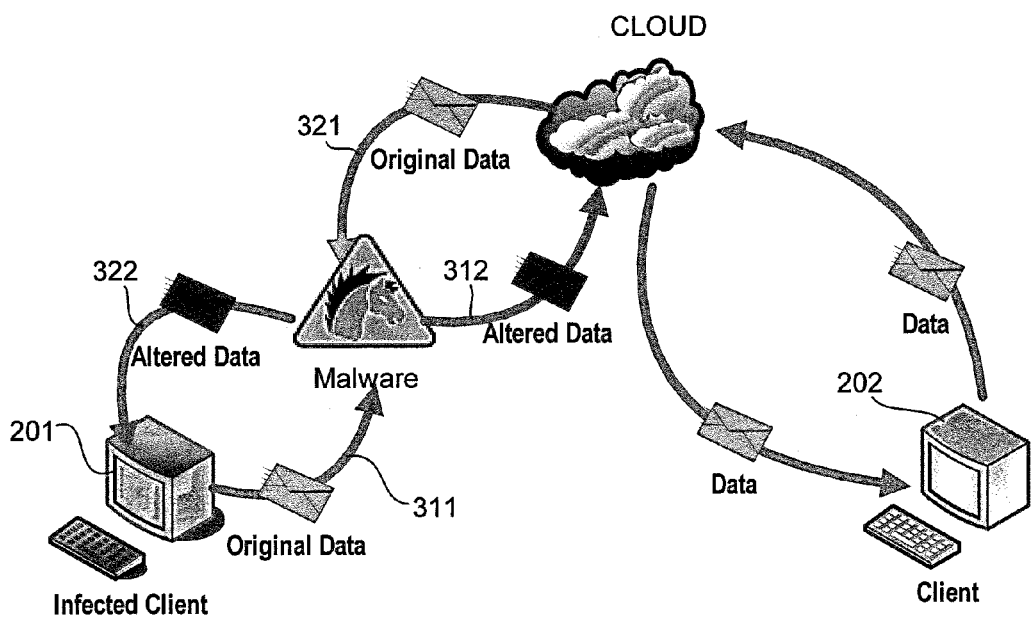
FIG. 3 schematically illustrates how malicious code running on another computer could compromise in-the-cloud data processing.

FIG. 3 schematically illustrates how malicious code, also referred to as "malware," running on another computer could compromise in-the-cloud data processing. In the example of FIG. 3, the client computer 202 sends and receives data to and from the cloud as before. While the client computer 201 appears to be doing the same, its user is unaware that the malware on another computer is intercepting data sent from the client computer 201 to the cloud (arrow 311). The malware alters the data before sending the data to the cloud (312). The altered data may contain malicious code that could infect the cloud. The malware could also steal confidential information from the data. The malware may also receive original data (i.e., unaltered) data from the cloud (arrow 321) and alter the data before providing the altered data to the client computer 201 (arrow 322). The altered data may contain malicious code, such as a Trojan or computer virus, which in the example of FIG. 3 infects the client computer 201.

Figure 4:
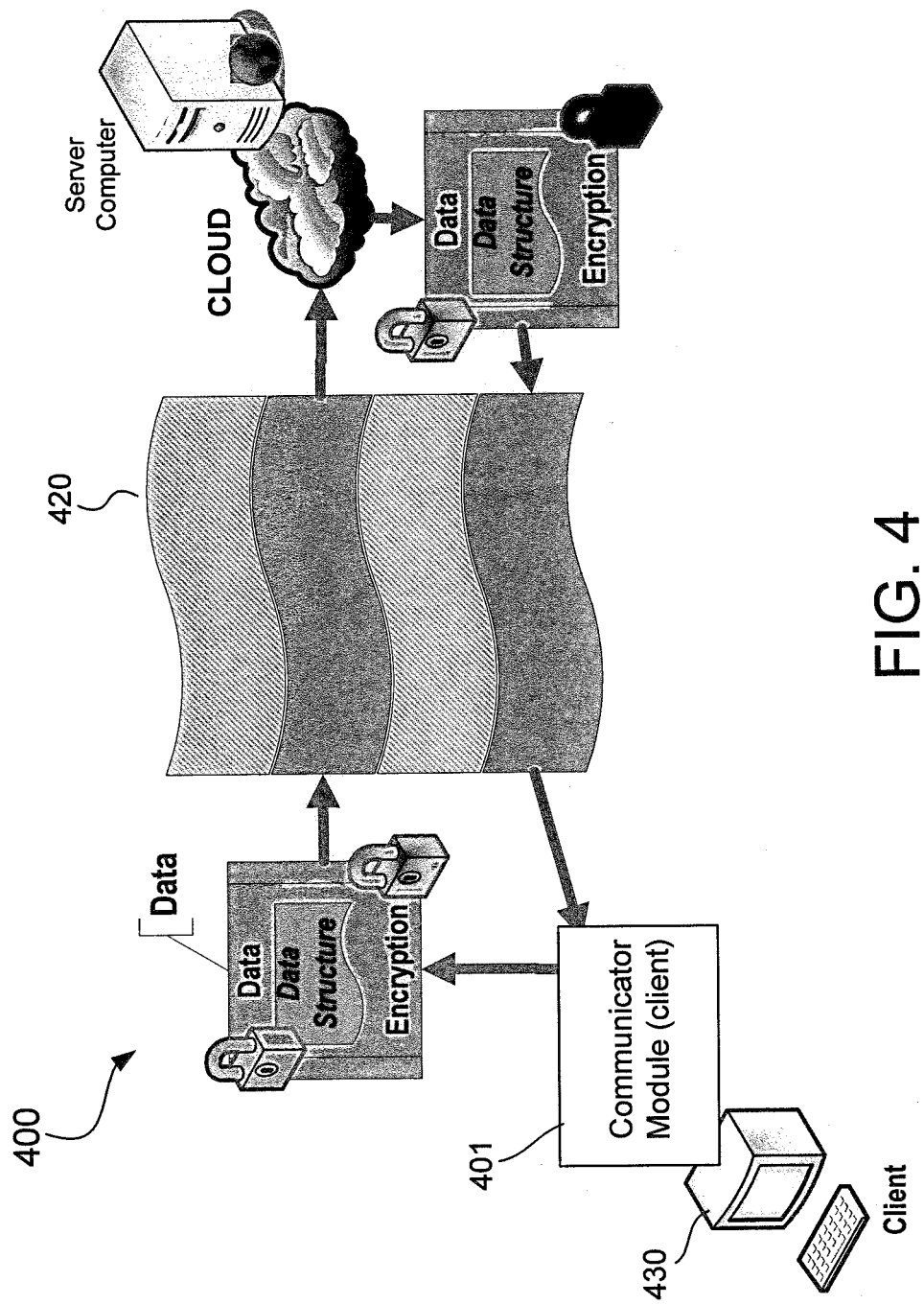
FIG. 4 schematically shows a cloud computing environment in accordance with an embodiment of the present invention.

FIG. 4 schematically shows a cloud computing environment 400 in accordance with an embodiment of the present invention. The computing environment 400 includes a communicator module ("communicator") 401 communicating with a cloud over one or more communication channels 420. The communication channels 420 may be along the network session, such particular network settings. A network setting may identify a network protocol, a network port number, and/or IP (Internet Protocol) address for sending and receiving data. Each of the communication channels 420 may comprise different network settings. For example, a channel A may be a combination of network protocol, network port number and IP address, while a channel B may be another combination of network protocol, network port number, and IP address.

In the example of FIG. 4, the communicator 401 comprises computer-readable program code running on a client computer 430. The cloud may comprise one or more server computers configured (e.g., programmed) to process data received from client computers. For example, the cloud may perform computer security service for one or more client computers 430 by scanning email or other data for spam, computer viruses, or other security threats.

As will be more apparent below, the cloud computing environment 400 provides comprehensive computer security by having three layers of data protection against security threats. First, the communicator 401 may be configured to have an update feature that prevents malware running on the client computer 430 or another computer from communicating with the cloud on behalf of the communicator 401. Second, data transferred between the client computer 430 and the cloud may have varying data structure and/or be encrypted with different keys that are not transmitted over the communication channels 420. Third, the client computer 430 and the cloud may communicate over different communication channels that are dynamically selected. These three layers of data protection may be implemented together, individually, or in combination.

Figure 5:
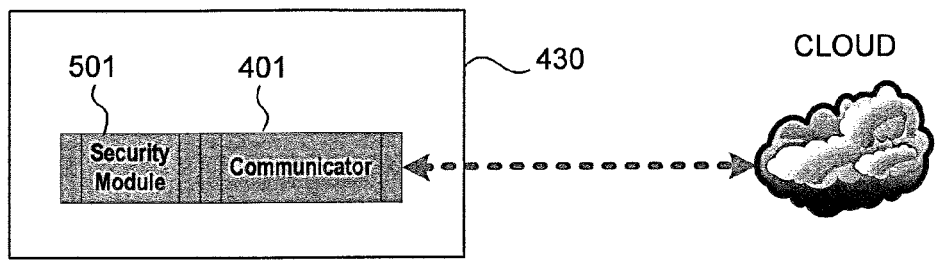
FIGS. 5-11 schematically illustrate a first layer of data protection involving regular updating of a communicator in accordance with an embodiment of the present invention.

FIGS. 5-11 schematically illustrate the first layer of data protection provided by the communicator 401 in accordance with an embodiment of the present invention. FIG. 5 schematically shows the communicator 401 serving as a cloud communication interface for the security module 501. For example, the communicator 401 may serve as a communication client for connecting the security module 501 to the cloud. As will be more apparent below, the communicator 401 may be also be configured to perform the second and third layers of data protection by providing data encryption/decryption and dynamic communication channel selection.

The security module 501 and the communicator 401 may comprise computer-readable program code running in the client computer 430 of FIG. 4. In one embodiment, the security module 501 comprises an antivirus configured to scan data (e.g., files, emails) for malicious codes, such as computer virus, Trojan, etc. The communicator 401 may be configured as a plug-in to the security module 501. The communicator 401 receives and processes communications between the security module 501 and the cloud. Communication between the security module 501 and the communicator 401 may be encrypted, proprietary, and/or have authentication mechanism to ensure the security module 501 is communicating with the communicator 401 and not malicious code.

The communicator 401 may be updated on a regular basis by receiving updates from a remotely located support server computer (not shown) and installing the updates on the communicator 401. The communicator 401 may be updated periodically, such as at least every three hours, for example. The update may include updating the algorithms used by the communicator 401 to perform its security functions, including algorithms for data authentication, data encryption/decryption, data restructuring, and dynamic communication channel selection.

Figure 6:
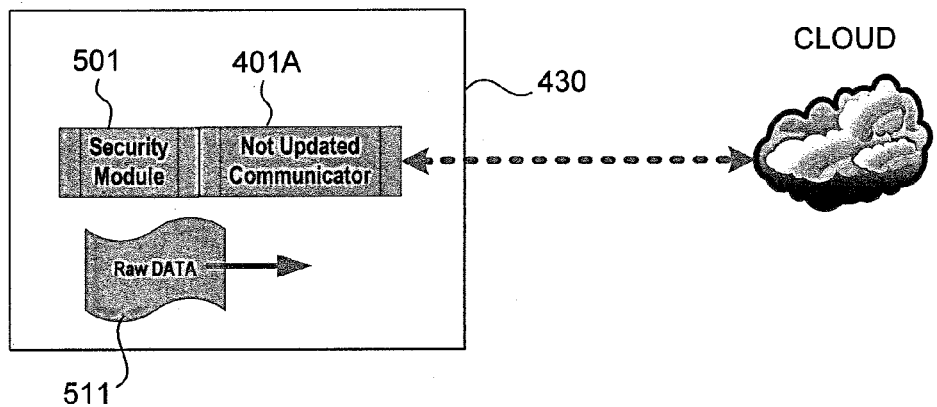
Figure 7:
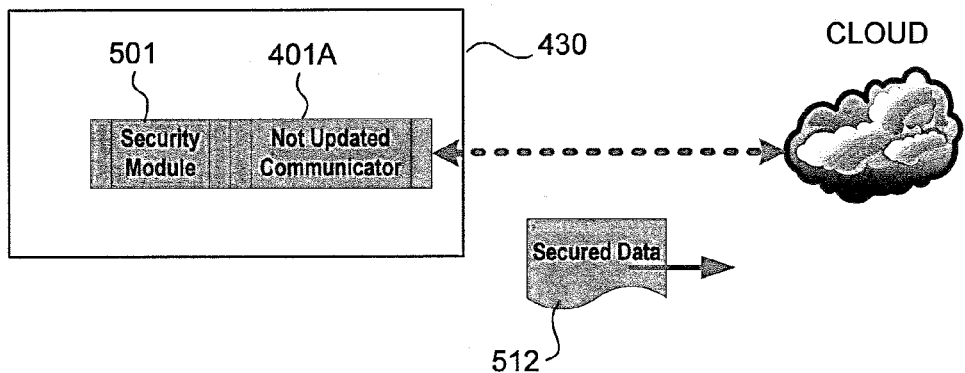

In the example of FIG. 6, the communicator 401 has been labeled as "401A" to indicate that it does not have the latest updates. The communicator 401A receives raw data 511 from the security module 501. For example, the raw data 511 may comprise data that the security module 501 cannot scan for malicious codes for various reasons, including lack of virus signature, insufficient computing resources, and so on. As another example, the raw data 511 may contain a URL (uniform resource locator) that the security module 501 needs to examine for security threat, such as whether the URL belongs to a known phishing website, spammer, or a web site prohibited by company policy or parental control. The communicator 401A (and the communicator 401 in general) may process the raw data 511 by varying the data structure of the raw data 511, encrypting the raw data 511 as later described with reference to FIGS. 12-19, and/or dynamically selecting the communication channel as later described with reference to FIGS. 20-24. Data processed by the communicator 401A is shown in FIG. 7 as "secured data 512." As shown in FIG. 7, the communicator 401A forwards the secured data 512 to be processed by a server computer in the cloud.

Figure 8:
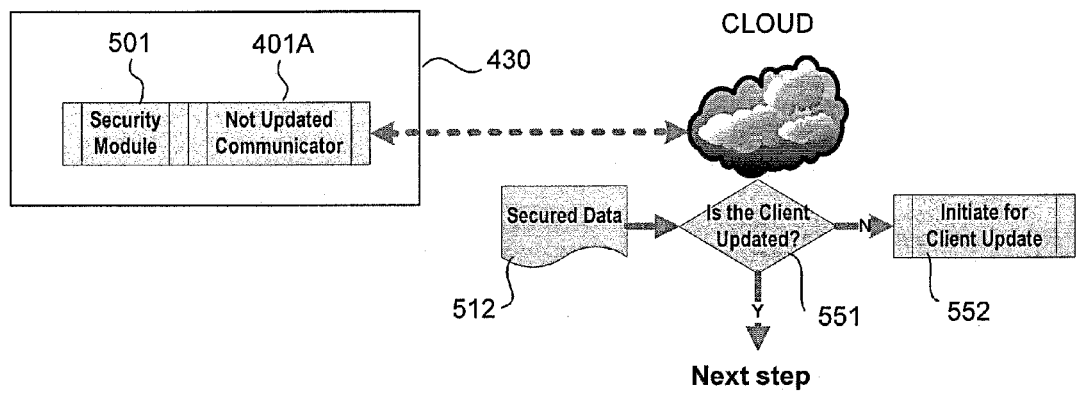

In FIG. 8, the cloud receives the secured data 512. The cloud may comprise one or more server computers programmed to process the secured data 512 as per steps 551-557 (shown in FIGS. 8, 9, and 10). The cloud (i.e., one or more server computers in the cloud) receives the secured data 512 and checks if the communicator 401A, which the cloud treats as a client, has the latest updates (step 551). For example, the secured data 512 may be transmitted with an indicator of the version number or update status of the communicator 401A. The indicator is preferably in a proprietary, encrypted, or other secured format that would prevent tampering. The cloud initiates updating of the communicator 401A if the cloud deems that the communicator 401A does not have the latest updates (step 552). Otherwise, if the communicator 401A has the latest updates, the cloud proceeds with the next step, which is step 553 of FIG. 10.

Figure 9:
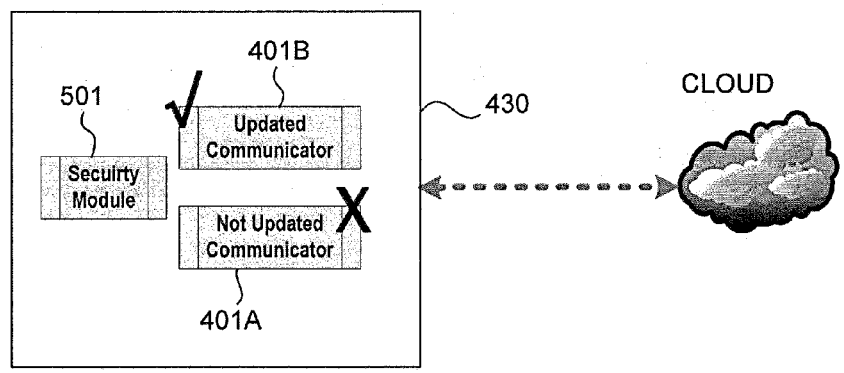

Because the communicator 401A is not updated in this example, the cloud proceeds with initiating the update of communicator 401A. For example, as shown in FIG. 9, the cloud may send the latest updates to the client computer 430 for installation to the communicator 401A. In the example of FIG. 9, the communicator 401A has been relabeled as "401B" to indicate that it has been updated with the latest updates received from the cloud. Updating the communicator 401A synchronizes it and the cloud to employ or expect particular algorithms in processing data.

Figure 10:
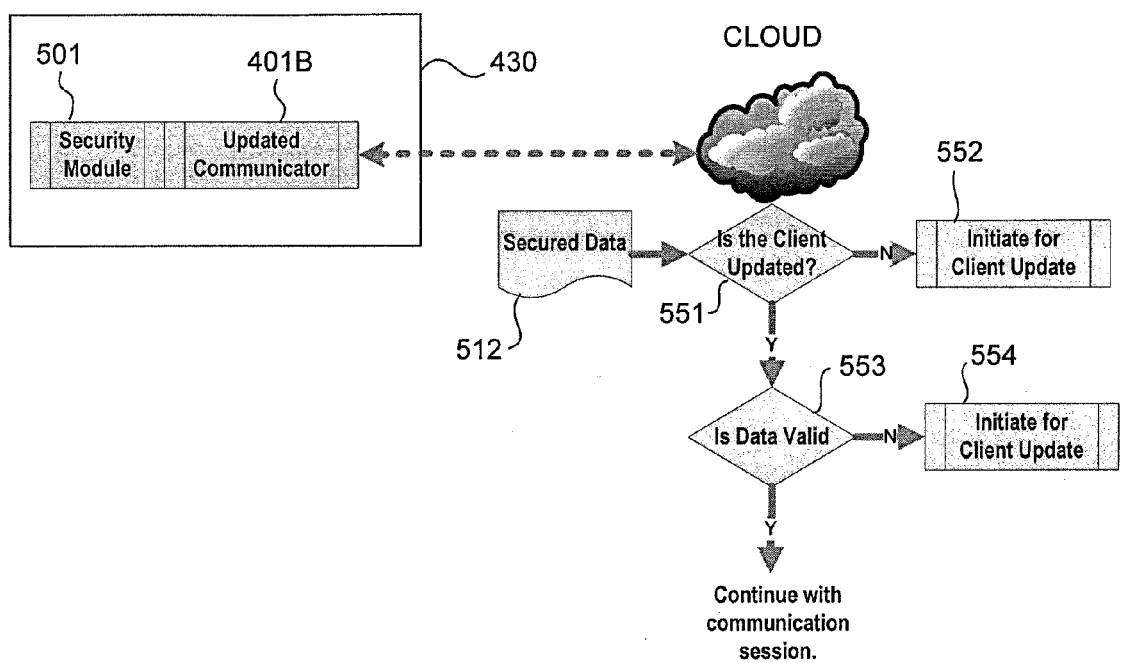

In FIG. 10, the updated communicator 401B re-processes the raw data 511 using the new algorithms from the latest update to regenerate the secured data 512. The communicator 401B sends the regenerated secured data 512 to the cloud, which determines that communicator 401B is updated (step 551 to step 553). The cloud then determines if the secured data 512 is valid (step 553). For example, the cloud determines if the secured data 512 has been processed using the latest algorithms. This may be performed by checking the format of the secured data 512. If the secured data 512 is not valid (e.g., in a format not recognized by the cloud), the cloud initiates updating of the communicator 401B to ensure the communicator 401B has the latest updates (step 554).

If the secured data 512 is valid, as is the case in this example, the cloud continues its communication session with the communicator 401B. For example, the cloud will process the secured data 512 as requested and forward the processed secured data back to the communicator 401B.

By updating the communicator 401 from time to time, it will be very difficult for malware or other security threats to alter the secured data generated by the communicator 401 without the cloud detecting a discrepancy in the secured data. This is because malware and other security threats will not know the latest algorithms employed by the communicator 401 to generate the secured data.

Figure 11:
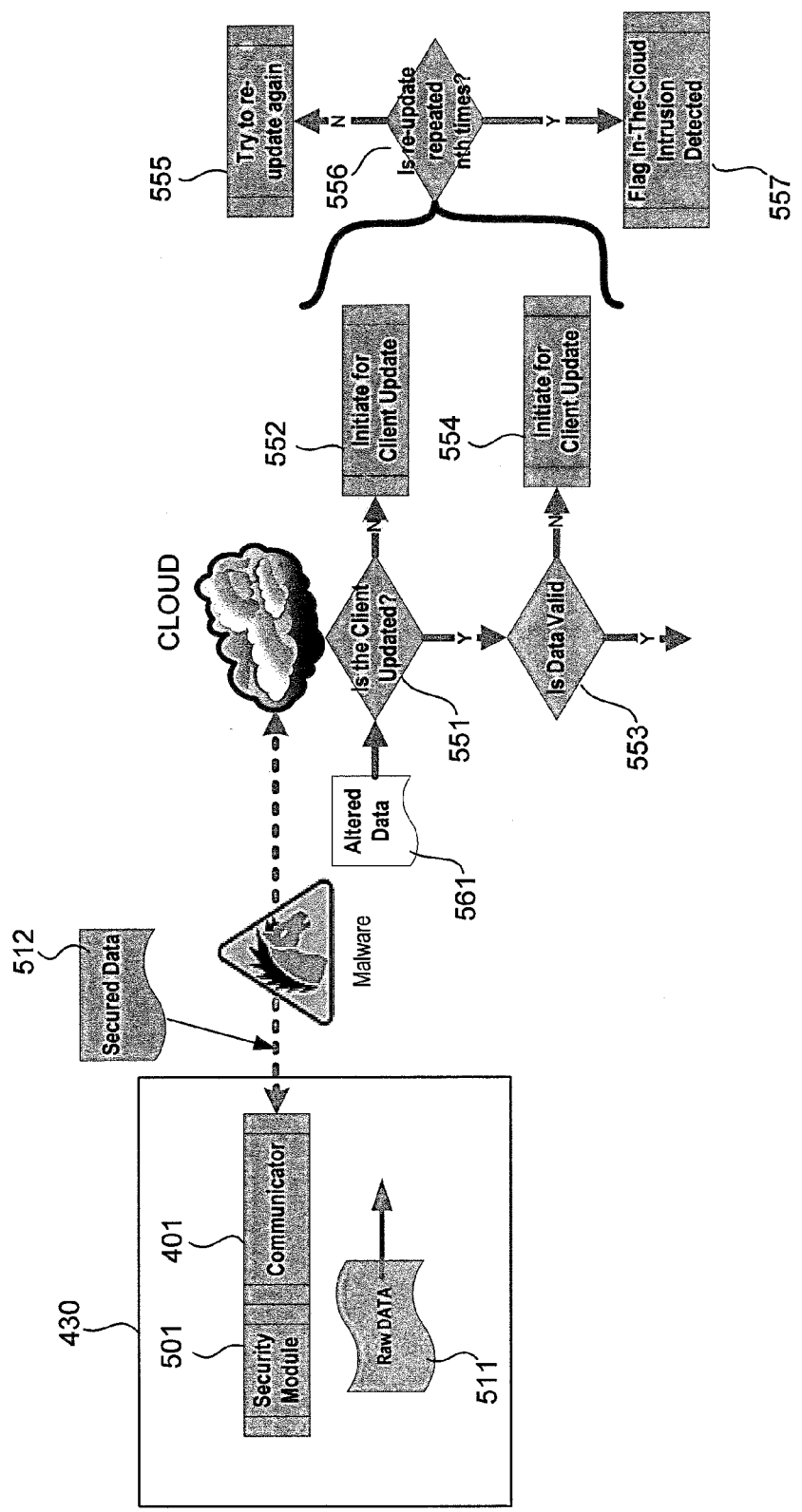

FIG. 11 schematically illustrates an example of how the regular updating of the communicator 401 prevents malware from altering the secured data provided to the cloud. As before, the security module 501 provides the raw data 511 to the communicator 401, which processes the raw data 511 to generate the secured data 512. In this example, the malware intercepts and alters the secured data 512 to generate the altered data 561. The cloud receives the altered data 561 and checks the update status of the secured data (step 551) and validity of the altered data 561 (step 553) as previously described. The altered data 561 will fail either or both of the checks because the altered data 561 has been generated by the malware, and the malware does not know the algorithms for creating data acceptable to the cloud. In that case, the cloud will attempt to update the communicator 401. When the altered data keeps failing the checks, the cloud will try to re-initiate the update (step 555) a certain number of times (step 556), after which the cloud will deem that the communication between the communicator 401 and the cloud has been compromised (step 557). At that point, the cloud may raise a flag by alerting the cloud administrator, logging the incident, alerting the user of the client computer 430, or perform other remedial action.

The communicator 401 may also be configured to check whether or not data received from the cloud is valid by, for example, checking the data for a predetermined format consistent with data processing using algorithms known to the communicator 401. If data received from the cloud is invalid, the communicator 401 may request the cloud to resend the data rather than request an update. That is, only the cloud can initiate an update of the communicator 401 in this example. If the data received from the cloud remains invalid after a predetermined number of resends, the communicator 401 may deem the connection between the communicator 401 and the cloud to be compromised, and accordingly perform a remedial action.

As part of the second layer of data protection, the communicator 401 may be configured to restructure the raw data 511 received from the security module 501 using an algorithm understood by both the communicator 401 and the cloud. Such a data restructuring algorithm may be included in the updates provided by the cloud to the communicator 401. In one embodiment, data restructuring is performed by changing the enumeration of variables of a data structure. This way, even when malware (or other security threat) intercepts and alters the data, the malware will not be able to understand the data or alter the data without the cloud detecting the alteration. For example, raw data having the structure shown in Table 1 may be restructured as shown in Table 2 or Table 3. Note that the data restructuring of Tables 2 and 3 moves the order of the variables enumerated in Table 1. Identification of variables to be rearranged and in what order may be included in an algorithm sent by the cloud to the communicator 401 as part of the update.

TABLE 1

(RAW DATA)

struct OurData{
    FileName,
    CRC1,
    SIZE1,
    CRC2,
    SIZE2,
    CRC3,
    SIZE3,
    VALIDITY_FOR_RAW_Data,
    ...
}

TABLE 2

(Re-Structured RAW DATA)

struct OurData{
    FileName,
    SIZE1,
    CRC1,
    SIZE2,
    CRC2,
    VALIDITY_FOR_RAW_Data,
    CRC3,
    SIZE3,
    ...
}

TABLE 3

(Re-Structured RAW DATA)

struct OurData{
    SIZE1,
    CRC3,
    SIZE3,
    CRC1,
    SIZE2,
    CRC2,
    VALIDITY_FOR_RAW_Data,
    FileName,
    ...
}

As part of the second layer of data protection, the communicator 401 and the cloud may also be configured to communicate using an encryption scheme wherein the key used to encrypt the data is not sent to the receiver of the data. The key remains with the transmitter that performed the encryption.

This advantageously prevents the key from being intercepted and used by a security threat to open and alter the encrypted data. This embodiment is now described with referenced to FIGS. 12-19.

Figure 12:
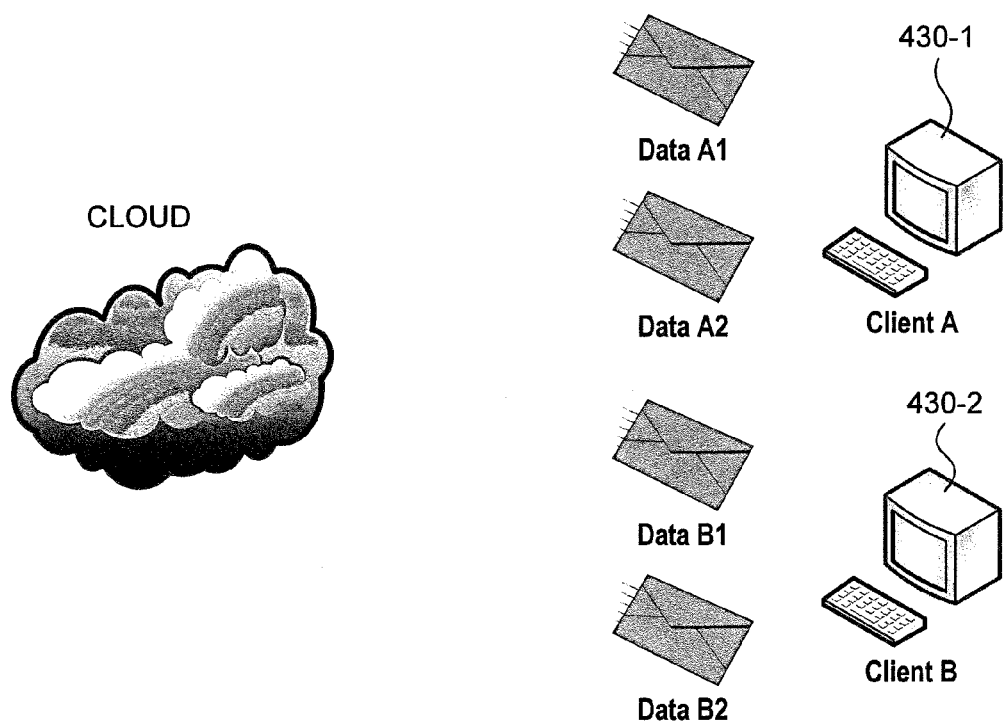
FIGS. 12-19 schematically illustrate a second layer of data protection involving an encryption scheme in accordance with an embodiment of the present invention.

FIG. 12 schematically shows a plurality of client computers 430 (i.e., 430-1 and 430-2) communicating with the cloud. The client computers 430 may communicate with the cloud using the above-described communicator 401 (see also FIG. 4). Data to be transmitted from the client computer 430-1 to the cloud are labeled as Data A1 and A2, while data to be transmitted from the client computer 430-2 to the cloud are labeled as Data B1 and B2.

Figure 13:
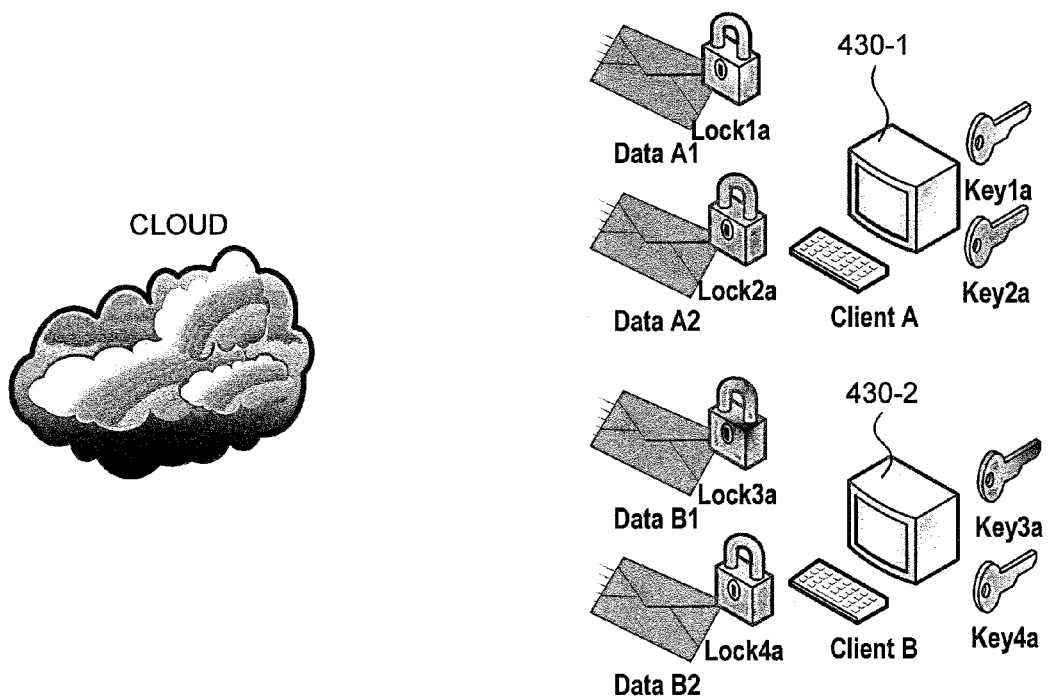

In FIG. 13, the client computer 430-1 encrypted the Data A1 and A2 using a Key1a and Key2a, respectively. Similarly, the client computer 430-2 encrypted the Data B1 and B2 using a Key3a and Key4a, respectively. The data are shown with Lock1a, Lock2a, Lock3a, and Lock4a to indicate that the data have been encrypted. In one embodiment, the data is encrypted using a commutative encryption algorithm.

Figure 14:
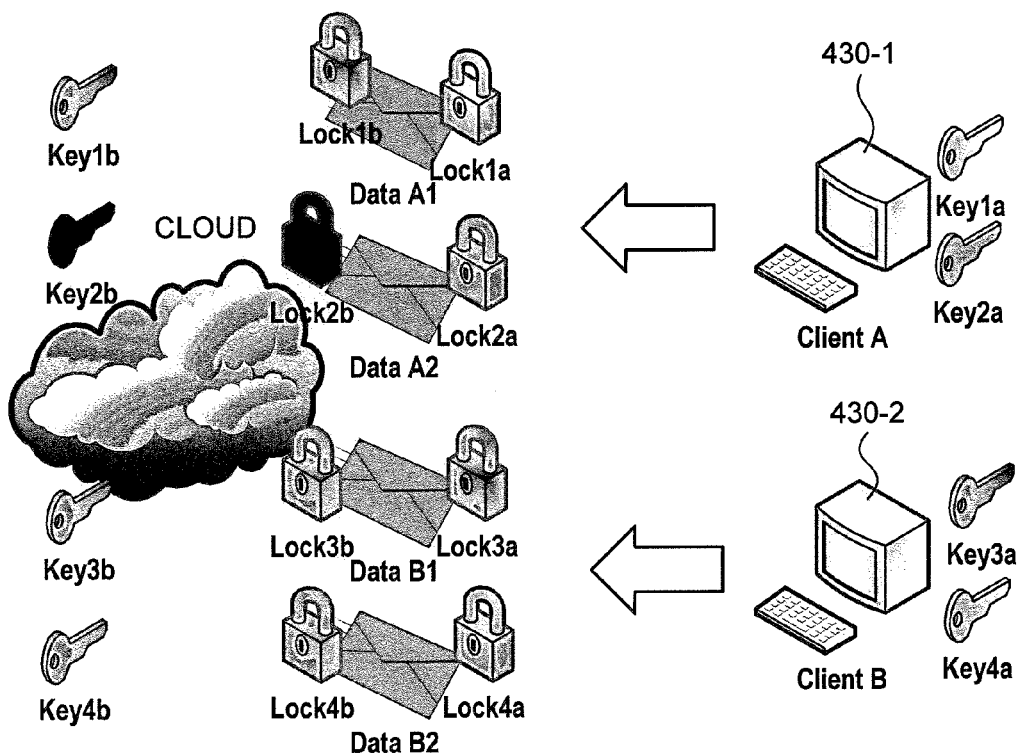

In FIG. 14, the client computers 430 send their respective Data A1, A2, B1, and B2 to one or more server computers in the cloud. The client computers 430 do not transmit the keys to the cloud or another computer. The cloud receives the encrypted Data A1, A2, B1, and B2 and, after validation, encrypts them using the Key1b, Key2b, Key3b, and Key4b, respectively. At this time, the Data A1, A2, B1, and B2 are encrypted twice. The data are shown with Lock1a, Lock2a, Lock3a, and Lock4a to indicate that the data have been encrypted using keys from the client computers 430, and with Lock1b, Lock2b, Lock3b, and Lock4b to indicate that the data have been encrypted using keys from the cloud.

Figure 15:
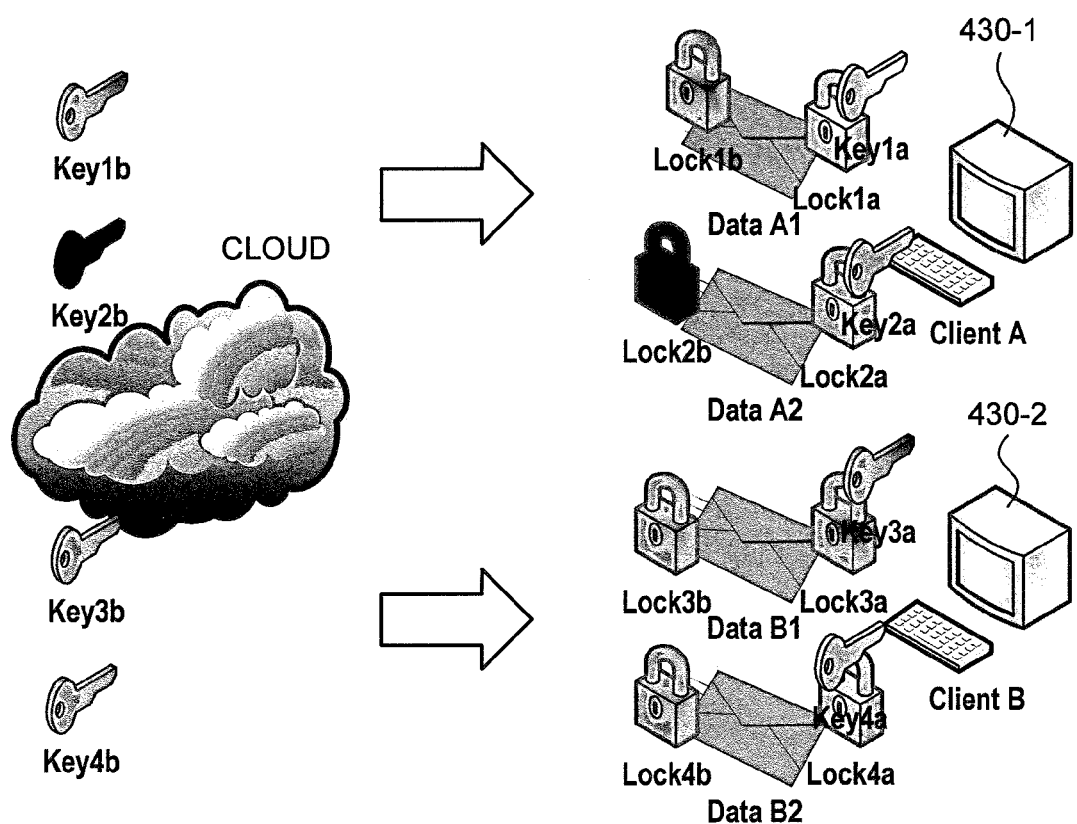

In FIG. 15, the cloud sends the Data A1 and A2 back to the client computer 430-1, and the Data B1 and B2 back to the client computer 430-2. The cloud does not transmit the Key1b, Key2b, Key3b, and Key4b to the client computers 430 or another computer.

Figure 16:
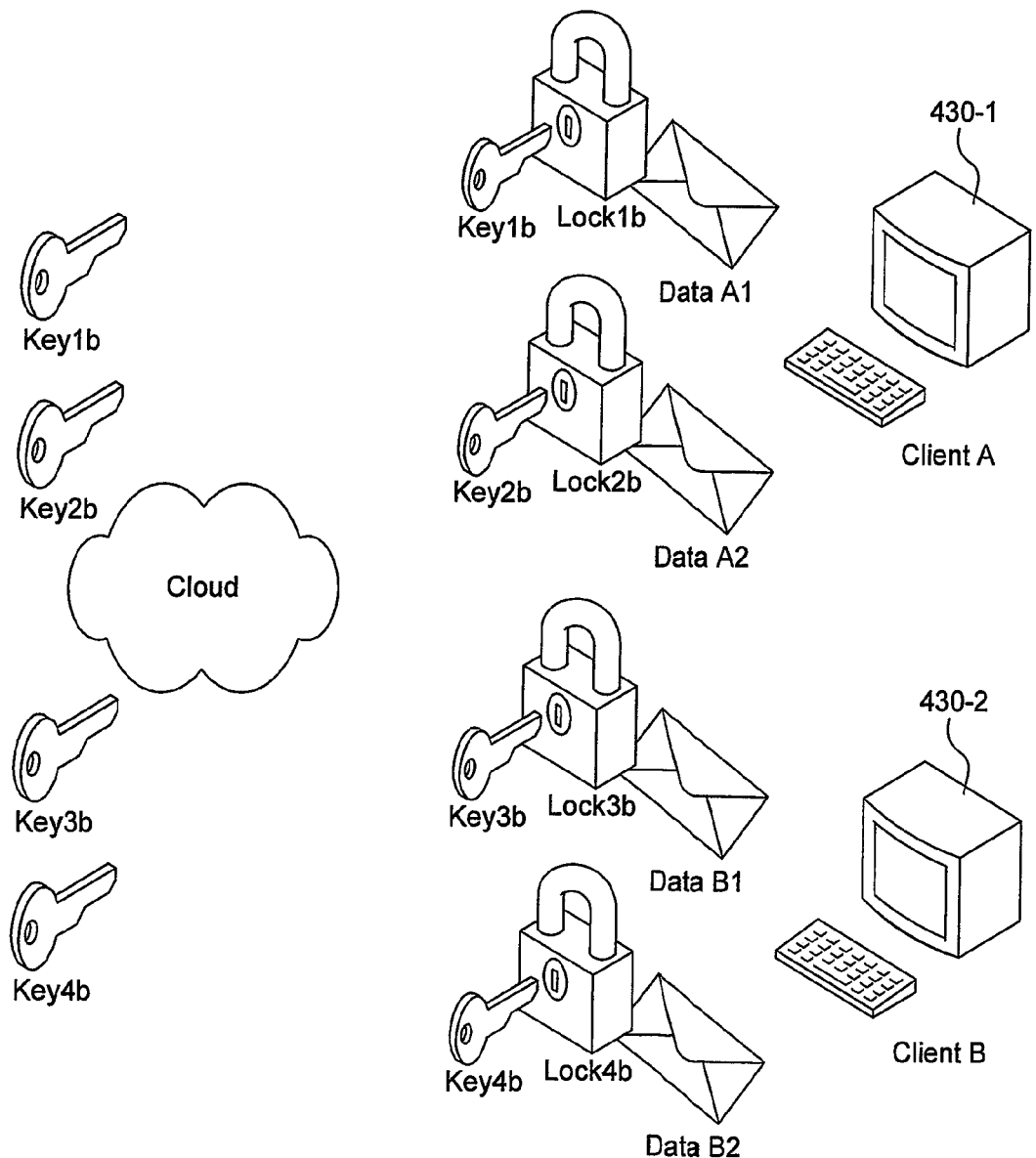

In FIG. 16, the client computer 430-1 decrypts the Data A1 and A2 using the key1a and the key2a, respectively, after validation. Likewise, after validation, the client computer 430-2 decrypts the Data B1 and B2 using the key3a and the key4a, respectively. At this time, the Data A1, A2, B1, and B2 are only encrypted using the Key1b, Key2b, Key3b, and Key4b, which remain in the cloud.

Figure 17:
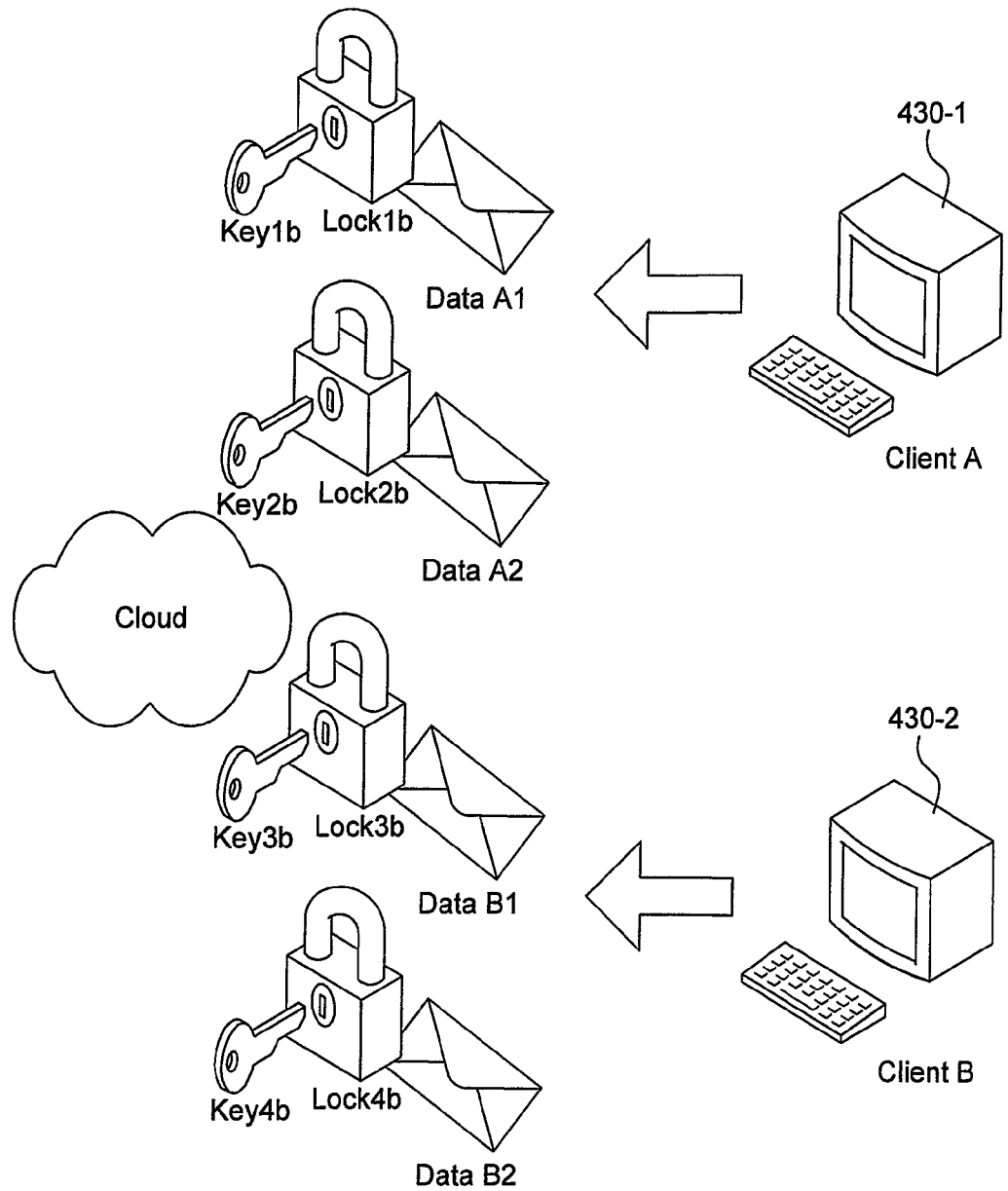

In FIG. 17, the client computers 430 forward the Data A1, A2, B1, and B2 back to the cloud.

Figure 18:
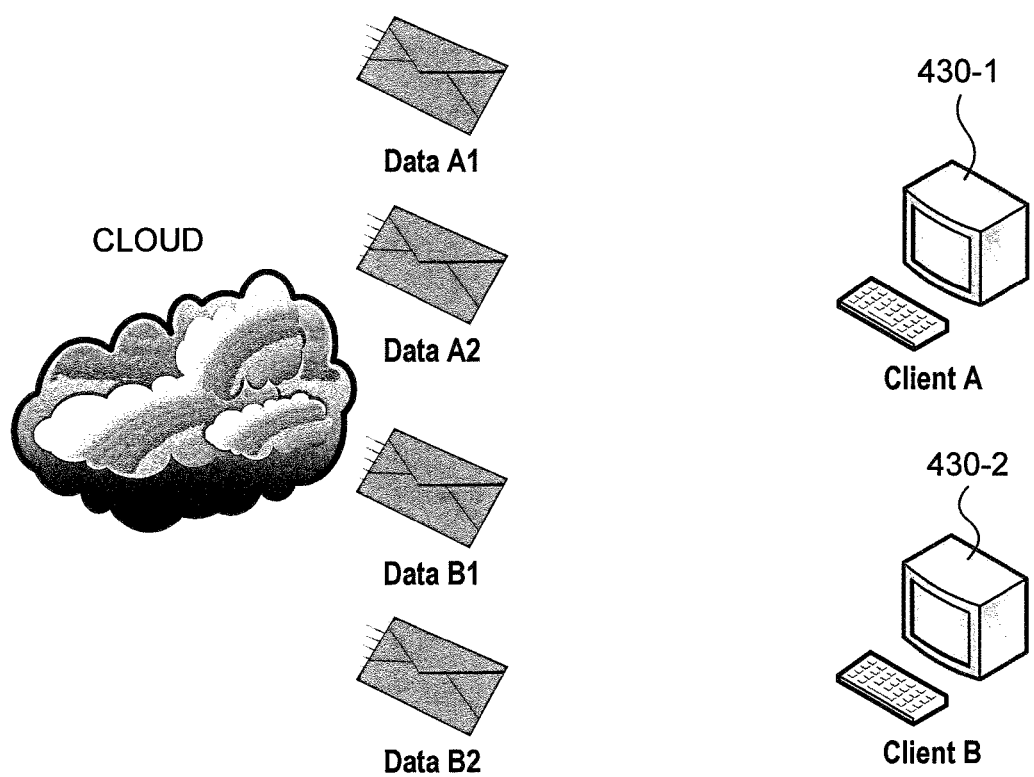

In FIG. 18, the cloud validates the Data A1, A2, B1, and B2 and then decrypts them using the Key1b, Key2b, Key3b, and Key4b. The cloud then processes the Data A1, A2, B1, and B2. The same encryption scheme is repeated when forwarding the processed data back to the client computers 430.

Figure 19:
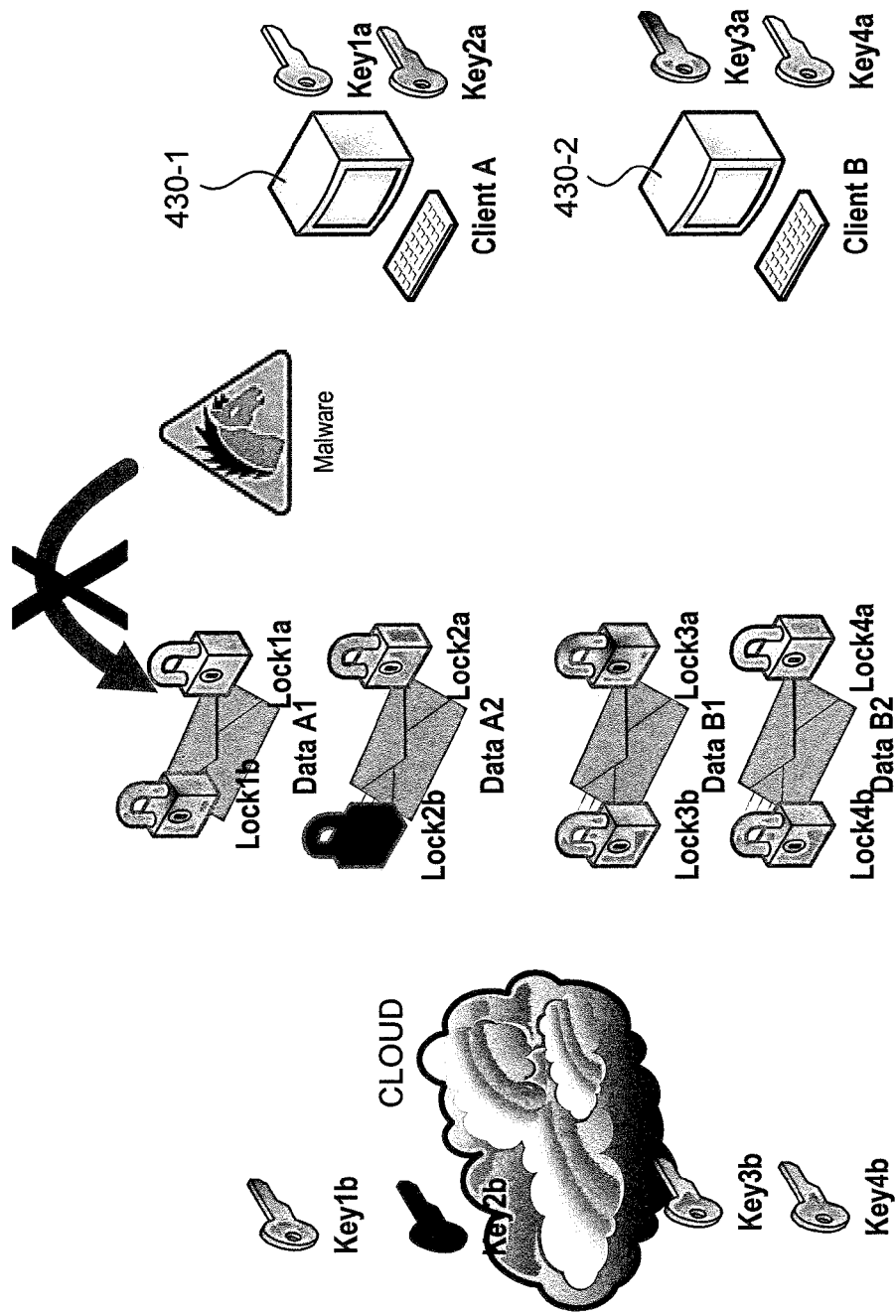
Figure 24:
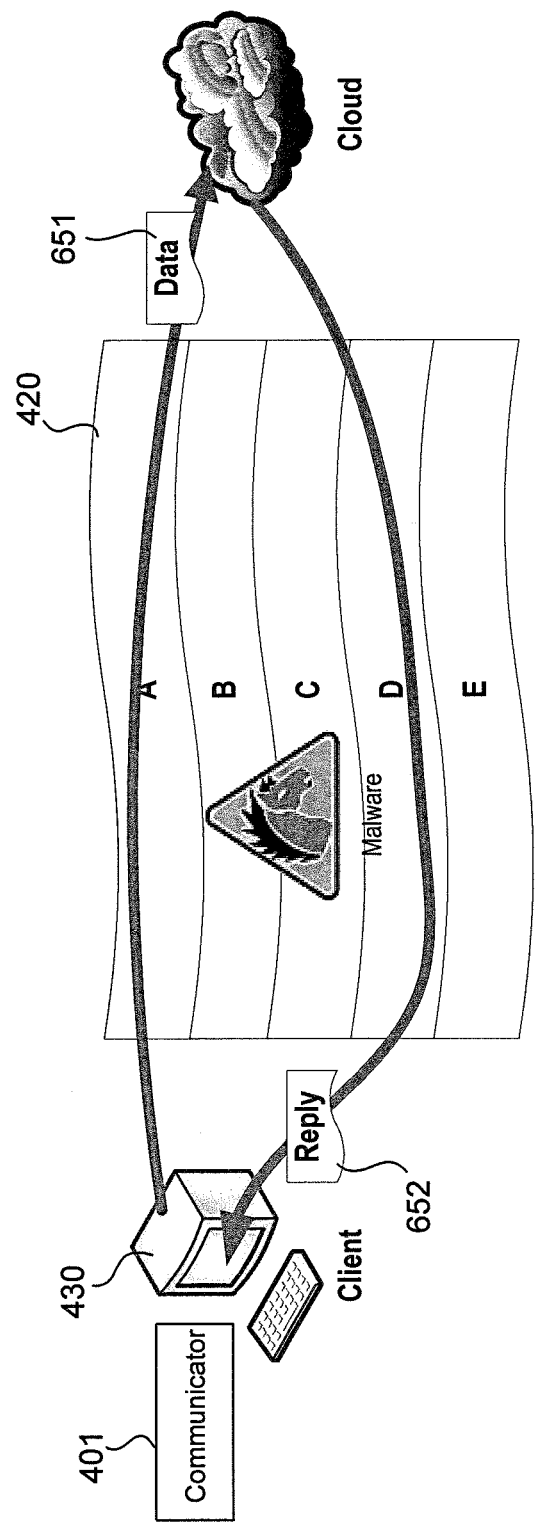

As can be appreciated, the above-described transmission technique allows encrypted data to be transmitted between the cloud and the client computers 430 without having to transmit the encryption keys out of the client computers 430 or the cloud. Even when malware eavesdrops on the data transmission, as illustrated in FIG. 19, the malware will not be able to make sense of the data because it is encrypted. The malware will not be able to decrypt the data because the malware does not have access to the data's encryption keys, which are not transmitted to the receiver of the data (or out of the computer that performed the encryption in this example). Furthermore, the regular updating of the communicator 401 in combination with this technique makes cracking the encryption even more difficult because the encryption algorithm changes on a regular basis as part of the update.

As part of the third layer of data protection, the communicator 401 and the cloud may also be configured to dynamically select the communication channel to be used in transmitting and receiving data. In one embodiment, the transmitter of the data specifies the channel over which the next communication is to be transmitted. By dynamically selecting the communication channels, malware or other security threats will find it difficult to intercept or eavesdrop on the communication. This aspect of the invention is now described with reference to FIGS. 20-24.

In FIGS. 20-24, the communicator 401 runs on the client computer 430 and communicates with the cloud over the communication channels 420 (also shown in FIG. 4). The communication channels 420 may be over the Internet. In the example of FIGS. 20-24, the communication channels 420 consist of channels A, B, C, D, and E. Each of the channels may be, for example, a particular network protocol (e.g., TCP, UDP, etc.), network port number, and IP address. A channel may also be a particular network setting, such as a combination of network protocol, network port number, and IP address. Each of channels A, B, C, D, and E may comprise different network settings.

In FIG. 20, the communicator 401 sends data 651 to the cloud using channel A. The data 651 may include information indicating the channel on which the cloud should send its reply; the communicator 651 will expect the reply from that channel. In the example of FIG. 21, the data 651 indicates that the communicator 401 expects a reply to the data 651 to be sent on channel D, which is different from channel A. As an example, the channel D may be a network protocol, IP address, and network port number for sending data to the communicator 401.

In FIG. 22, the cloud sends the reply 652 on the channel indicated in the data 651, which in this example is channel D. The reply 652 is responsive to the data 651. For example, the data 651 may request scanning of a file for malicious code and the reply 652 indicates the result of the malicious code scanning. The cloud may indicate in the reply 652 the channel on which the communicator 401 should send the next communication from the communicator 401. In the example of FIG. 23, the reply 652 indicates that the cloud expects the next query or communication from the communicator 401 to be sent on channel C. As an example, the channel C may be a network protocol, IP address, and network port number for sending data to the cloud. Channel C may be different from channels A and D.

By indicating in the data/reply the channel on which the next communication should be sent, security threats will find it difficult to intercept or eavesdrop on the communication. For example, in the example of FIG. 24, by dynamically changing the channels on which the data 651 and the reply 652 are transmitted, the malware on another computer will have a difficult time intercepting the data 651 and the reply 652. Dynamic channel selection in conjunction with regular updating of algorithms, data encryption/decryption without transmitting the keys to the receiver, and data restructuring make it even harder for security threats to compromise data processed in cloud computing environments.

Techniques for protecting data processed in the cloud have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of protecting data processed in a cloud computing environment, the method comprising:

encrypting original data using a first key in a client computer to generate a first encrypted data;

providing the first encrypted data from the client computer to a server computer over a first channel;

encrypting the first encrypted data using a second key in the server computer to generate a second encrypted data;

providing the second encrypted data from the server computer to the client computer;

decrypting the second encrypted data in the client computer using the first key to generate a third encrypted data;

providing the third encrypted data from the client computer to the server computer; and decrypting the third encrypted data in the server computer using the second key to generate the original data, wherein the first encrypted data is transmitted to the server computer together with information indicating a second channel that is different channel from the first channel over which to transmit the second encrypted data, the first key is different from the second key, and the second key is not sent by the server computer to the client computer.

2. The method of claim 1 wherein the client computer is regularly updated with an algorithm for encrypting the original data.

3. The method of claim 1 wherein the first encrypted data includes data structure that is restructured relative to the original data.

4. The method of claim 3 wherein the client computer is regularly updated with an algorithm for rearranging the original data.

5. The method of claim 1 wherein the first key is not transmitted out of the client computer.

6. The method of claim 1 wherein the second key is not transmitted out of the server computer.

7. A system comprising:

a client computer that encrypts original data using a first key to generate a first encrypted data, transmits the first encrypted data to a server computer over a first channel, receives a second encrypted data from the server computer after transmitting the first encrypted data to the server computer, decrypts the second encrypted data received from the server computer using the first key to generate a third encrypted data, and provides the third encrypted data to the server computer; and the server computer that receives the first encrypted data from the client computer, encrypts the first encrypted data using a second key to generate the second encrypted data, transmits the second encrypted data to the client computer, receives the third encrypted data from the client computer after transmitting the second encrypted data to the client computer, and decrypts the third encrypted data using the second key to generate the original data in the server computer, wherein the client computer transmits the first encrypted data to the server computer together with information indicating a second channel that is different from the first channel over which to transmit the second encrypted data, the first key is different from the second key, and the server computer does not send the second key to the client computer.

8. The system of claim 7 wherein the client computer is regularly updated with an algorithm for encrypting the original data.

9. The system of claim 7 wherein the client computer is regularly updated with an algorithm for rearranging the original data.

10. The system of claim 7 wherein the client computer does not transmit the first key out of the client computer.

11. The system of claim 7 wherein the server computer does not transmit the second key out of the server computer.

* * * * *